United States Patent [19]

Sims et al.

[11] Patent Number: 4,953,995
[45] Date of Patent: Sep. 4, 1990

[54] DOT MATRIX PRINTER AND METHOD FOR PRINTING MULTIPLE LINES AT DIFFERENT LINE SPACINGS

[75] Inventors: Louis Sims; Fred LeFriec, both of Spokane, Wash.; Joseph Dubner, Hayden Lake, Id.; Brian Peavey, Spokane, Wash.

[73] Assignee: Output Technology Corporation, Spokane, Wash.

[21] Appl. No.: 185,452

[22] Filed: Apr. 25, 1988

Related U.S. Application Data

[63] Continuation of Ser. No. 924,352, Oct. 29, 1986, abandoned.

[51] Int. Cl.⁵ ............................................. B41J 3/10
[52] U.S. Cl. ................................. 400/121; 101/93.04; 400/555
[58] Field of Search ............... 400/121, 124, 582, 583, 400/303, 545, 555, 82; 101/93.04, 93.05

[56] References Cited

U.S. PATENT DOCUMENTS

| | | | |
|---|---|---|---|
| 3,803,628 | 4/1974 | Van Brimer et al. | 346/1 |
| 4,033,444 | 7/1977 | Beery | 400/124 |
| 4,159,882 | 1/1979 | Sanders et al. | 400/124 |
| 4,408,907 | 10/1983 | Bernardis | 400/124 |
| 4,473,311 | 9/1984 | Sakaida | 400/124 |
| 4,580,145 | 4/1986 | Natsume | 346/76 PH |
| 4,601,593 | 7/1986 | Collina et al. | 400/121 |
| 4,721,401 | 1/1988 | Malcolm | 400/121 |
| 4,871,270 | 10/1984 | Werbach | 400/121 |

FOREIGN PATENT DOCUMENTS 109765  8/1981  Japan ................................. 400/124

OTHER PUBLICATIONS

IBM Technical Disclosure Bulletin, vol. 25, No. 1, Jun. 1982, p. 275-IBM Technical Disclosure Bulletin (Jun. 1982) Discloses a Two Line Dot Matrix Printer with Alternately Operable Print Heads, 400-82.

Primary Examiner—David A. Wiecking
Attorney, Agent, or Firm—Wells, St. John & Roberts

[57] ABSTRACT

A method and apparatus for printing multiple lines of characters simultaneously on a dot matrix printer and making available to the user a choice of alternate line spacings without physical or mechanical alteration of the printhead. The printhead includes an uninterrupted array of print elements having a total height greater than the combined total height of the multiple lines that are simultaneously printed plus the combined height of the intervening line spaces. By directing columnar character data to selected sets of print elements, the printhead can produce characters of a constant height with selected variations in interline spacing.

23 Claims, 11 Drawing Sheets

6 LPI PRINTING

8 LPI PRINTING

FIG 7

DOT MATRIX PRINTER AND METHOD FOR PRINTING MULTIPLE LINES AT DIFFERENT LINE SPACINGS

RELATED APPLICATIONS

This application is a continuation application of Ser. No. 924,352, filed Oct. 29, 1988, now abandoned.

TECHNICAL FIELD

This disclosure relates to dot matrix printers, and more specifically to a dot matrix printer designed to produce multiple lines of characters during each traverse of a recording medium by a printhead.

Background of the Invention

Dot matrix printers commonly employ a printhead with a plurality of individual printing elements arranged in an array extending across the rectilinear path of the printhead relative to a recording medium. As opposed to typewriters and other machines that print characters from fixed character fonts, a matrix printer activates individual printing elements in an array in a pattern of operation that is controlled by a stream of columnar data in successive steps as the printhead traverses a recording medium, such as paper. During each step, the printhead prints a column of dots and moves to the position of a succeeding column of dots.

Dot matrix printers presently take several forms. These include printheads where a plurality of print wires are selectively driven by corresponding solenoids to impact a printing surface directly or through a transfer ribbon. Typical examples of this form of printer are shown in U.S. Pat. No. 4,473,311 (Sakaida), issued Sept. 25, 1984, U.S. Pat. No. 4,408,907 (Bernardis), issued Oct. 11, 1983, and U.S. Pat. No. 4,159,882 (Sanders et al), issued Jul. 3, 1979.

Another form of dot matrix printer is the ink jet printer, which uses a number of individual ink jets to pulse droplets of ink in spatial combinations to print characters as a sequence of dots. A printer of this type is described in U.S. Pat. No. 3,803,628 (Van Brimer et al), issued Apr. 9, 1974.

A further classification of dot matrix printer is the thermal printer of the type in which printing of data is carried out by contact of multiple heated printing elements by heat sensitive paper or by ordinary paper and an intervening thermal transfer ribbon. An example of such a printer is generally described in U.S. Pat. No. 4,580,145 (Natsume), issued Apr. 1, 1986.

Because dot matrix printers require successive actuation of one or more columns of printing elements arranged across the relative path of movement between the recording medium and printhead, efforts to progressively increase their printing speed have involved printing while moving in opposite directions back and forth in a rectilinear path, the utilization of multiple printing heads arranged side-by-side along the rectilinear path, and the utilization of double or multiple height printheads arranged across the rectilinear path to simultaneously print two or more rows of characters during each traverse of the recording medium. Examples of dot matrix printers capable of printing two lines of characters during each traverse of the recording medium are disclosed in U.S. Pat. No. 4,408,907 (Bernardis), issued Oct. 11, 1983 (see FIG. 4) and U.S. Pat. No. 3,803,628 (Van Brimer et al), issued Apr. 9, 1974 (see FIG. 1).

Dot matrix printers typically utilize a uniform matrix pattern. They commonly employ printheads with 7 or 9 print elements in a vertical column perpendicular to the path of a moving printhead on which they are mounted. Also available are 18 and 24 print element heads, having two vertical columns of 9 and 12 print elements, respectively. These conventional printheads are designed to print a single line of characters during each traverse of the paper or other recording medium. The additional columns of print elements in the 18 and 24 printheads are used to print multiple columns in the same line of characters.

Current industry standards for computer printouts specify printing of English language alphanumeric characters by dot matrix printers in two formats—6 lines per inch and 8 lines per inch. In a single line printer, this requirement is achieved by varying the amount of paper fed perpendicularly by the printhead between each line. However, if two printheads are arranged in a printer to simultaneously print multiple lines across the paper, the spacing between the multiple printed lines cannot be varied without physical adjustment of printhead segments. Rotating the multiple line printhead would vary the printing density and would also change the line spacing between multiple rows, but it would also change the character height being printed. Mechanically changing spacing between lines also requires incorporation of an electrically operated mechanism in the printhead for changing the spacing between printhead segments or otherwise moving the printhead.

This disclosure describes an apparatus and method of employing a fixed printhead containing sufficient print elements to produce more than one line of printed characters simultaneously. It also describes a method for producing two or more different line spacings without physical modification of the printhead. The solution described herein embodies a printhead with sufficient print elements arranged in an uninterrupted array to accommodate the production of at least two lines of printed characters plus their interline space or spaces. The advantage of this versatile printer is that it can print at a higher speed than can single line printers. First, it prints multiple lines simultaneously, and second, only one turnaround period is required after printing the multiple lines. Where multiple printheads are placed side by side in a single line, time spent reversing printhead direction becomes a significant portion of the time required for printing.

The printer has further advantages in graphics printing applications, since the number of vertical pixels printed by the printhead can be increased to take advantage of the greater number of available print elements. For example, a printhead provided with an array of 21 print elements, which can produce two lines of characters 9 pixels high and spaced by one of at least two alternative line spacings, can readily handle 16-bit graphics data, rather than the 8 or 9-bit graphics data typically handled by conventional single line 9 print element heads.

BRIEF DESCRIPTION OF THE DRAWINGS

The preferred embodiment of the invention is illustrated in the accompanying drawings, in which:

FIG. 7 is a diagram illustrating the sequence in which columnar data is assembled in the computer registers or memory locations;

DETAILED DESCRIPTION OF THE PREFERRED EMBODIMENT

Figure 1:
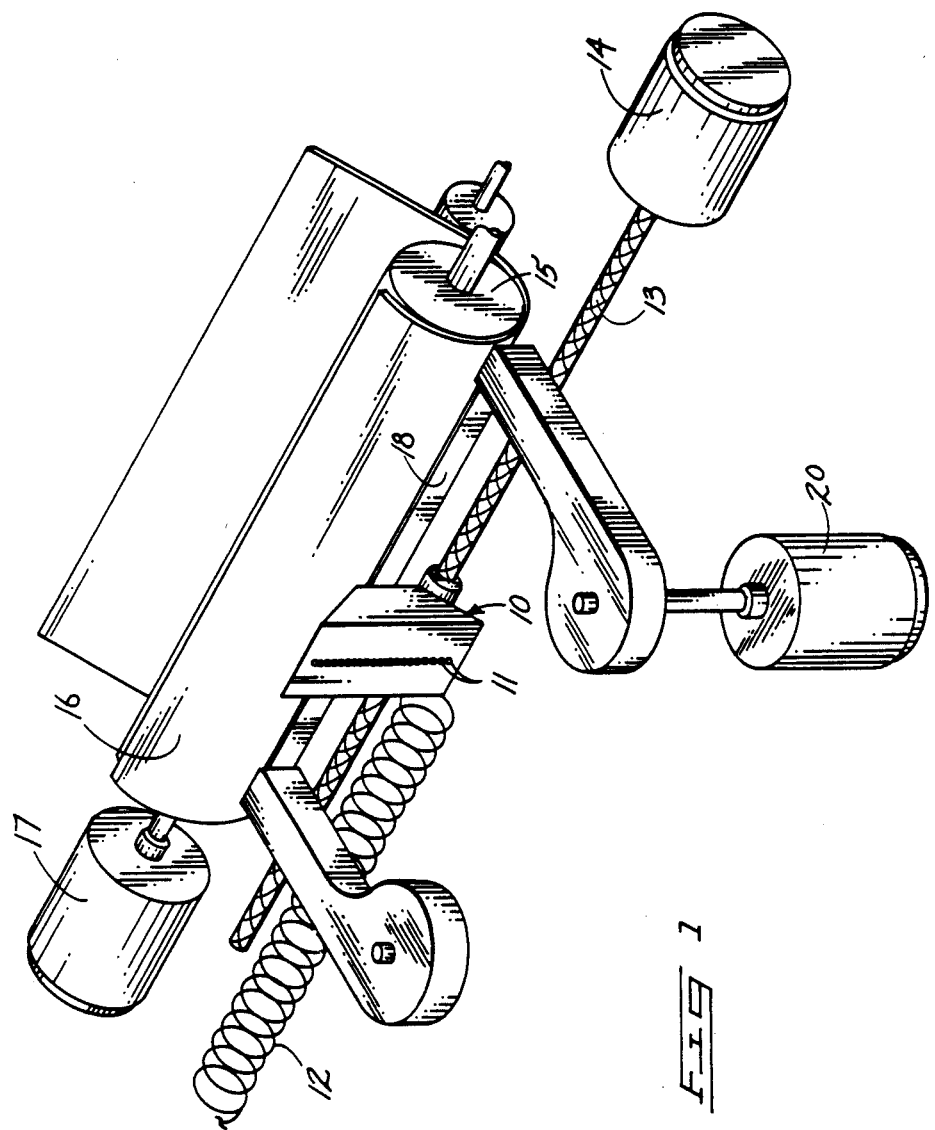
FIG. 1 is a simplified perspective view of the mechanical elements in a printer constructed according to this disclosure.

The following disclosure of the invention is submitted in compliance with the constitutional purpose of the Patent Laws "to promote the progress of science and useful arts" (Article 1, Section 8).

As used in this description, the term "dot matrix printer" shall refer to any existing or future dot matrix printer of the general type employing a printhead with one or more rows of printing elements arranged in an array extending across the rectilinear path of relative movement between the printhead and a recording medium, such as paper. While most such printers utilize mechanical arrangements wherein the printhead traverses the recording medium, the invention is equally applicable to arrangements where the recording medium is moved relative to the printhead during the printing process.

Examples of dot matrix technology to which the present invention can be applied include pin printers, ink jet printers, and thermal printers. The technical details of such printers are well known, and the manner by which the present improvements can be applied to the existing technology presently available for such printers will be readily understood by those skilled in this field.

While reference will be made to the commonly described "height" of characters, this term is not intended to be limited to any geometric specific orientation of the described equipment or methods. The usual "height" of English language alphanumeric characters printed in transverse successive lines across a sheet of paper will be used in this description to illustrate the present apparatus and method. It is to be understood that the apparatus and method are equally applicable to other fonts of characters, whether arranged horizontally across a sheet or whether arranged in lines extending vertically in directions parallel to the sheet length.

The specific descriptions of the invention shall also relate to today's common industry standards in the computer industry, which call for printing of computer outputs in formats of 6 lines per inch and 8 lines per inch. The dimensional requirements specified in this description to meet these standards can be readily extrapolated to other standards and formats to which the apparatus and method are applicable.

The apparatus and method are specifically described as applied to printing of two lines of characters simultaneously. It is to be understood that the disclosure can be readily applied to the printing of more than two lines, and has the capability of spacing the lines by more than two alternative line spacings.

For simplicity, the present description relates to a printhead having a single row of equally spaced, functionally identical print elements in an array that extends perpendicularly across the rectilinear path of relative movement between the printhead and recording medium. The novel concept embodied in the described apparatus and method can encompass existing dot matrix printer enhancements and techniques for increasing density or quality of printing, such as fractional dot shift techniques, multiple passes, and multiple rows of print elements. It is also to be understood that the described print elements need not be in a straight row. They can be in other uninterrupted geometric patterns, such as a diagonal row, a diamond configuration, a curved row, or other geometric arrays capable of meeting the requirements of the described improvement. In all instances, the throughput of the present improvement will be significantly greater than is typically available today where printers capable of producing two or more line spacings do so by printing a single line of characters and varying the line spacing between adjacent rows by operation of the paper feed mechanism. The present method essentially involves:

(a) providing a printhead having a plurality of print elements arranged in an uninterrupted array having a total height at least equal to the combined heights of the multiple lines of characters to be simultaneously printed plus the combined heights of the maximum total line spacing between them.

(b) actuating two or more sets of print elements in the array as a function of a selected line spacing chosen from at least two alternate line spacings.

The method for printing successive lines of characters on a recording medium in columns of dots within matrices having a common height and with adjacent lines of characters spaced apart by one of two or more selectable line spacings more specifically comprises the following series of steps:

(a) Columnar data for two or more lines of characters are stored in memory. This columnar data includes pixel patterns required during printing of a group of multiple lines across a recording medium.

(b) Line spacing control signals are stored. These signals are indicative of a line spacing selected from two or more alternative line spacings.

(c) The stored columnar data for two or more lines of characters is directed to separate sets of print elements. The sets of print elements are included within an uninterrupted array of print elements having a total height greater than the total height of the group of multiple lines of characters that are to be simultaneously printed. The sets of print elements are defined in response to the stored line spacing control signals.

(d) The separate sets of print elements are simultaneously actuated to print a group of multiple lines of characters as defined by the stored columnar data. The lines within each group are separated by the selected line spacing as defined by the stored line spacing control signals.

(e) The recording medium is then advanced to space adjacent groups of multiple lines by the selected line spacing as defined by the stored line spacing control signals. This step is accomplished after completing the printing of each group of multiple lines.

The result of the above method is a substantial increase in the overall printing speed achievable in a dot matrix printer, in comparison to printing speeds available in printers that produce only a single line of print while traversing the recording medium. More importantly, the method provides selectability in line spacing during multiple line printing procedures, without requiring mechanical manipulation of all or any segment of the printhead. Line spacing is achieved by selection of sets or groups of print elements spaced apart in an uninterrupted array to produce a line spacing between the simultaneously printed lines selectable from at least two alternatives, together with subsequent control of the advance of the recording medium to similary space adjacent groups of multiple printed lines.

The apparatus described herein for simultaneously printing groups of multiple lines of characters in a dot matrix at any one of a plurality of line spacings makes use of a printhead provided with a plurality of print elements arranged in an uninterrupted array having a total height at least equal to the combined heights of the multiple lines of characters to be simultaneously printed plus the combined heights of the maximum total line spacing selectable between them. Control means are provided for selectively actuating two or more sets of print elements in the array as a function of a selected line spacing chosen from at least two alternate line spacings. The control means can be a hard-wired apparatus, such as two or more alternate switching circuits for directing stored columnar data signals to print elements in the array within sets spaced apart by the selected line spacing. It also can be provided by utilizing a programmed data processor for storing columnar data representative of each line of characters, combining the stored columnar data as a function of the selected line spacing, and directing the combined columnar data to individual print elements.

The apparatus for carrying out this method more specifically comprises a printer having the following elements:

(a) A printhead having an array of individually operable print elements extending across its rectilinear path relative to a recording medium. The total dimension of the array in a direction perpendicular to the rectilinear path is greater than the combined heights of the multiple lines to be printed during each traverse of the recording medium.

(b) Memory means is provided for storing electronically generated columnar data for two or more lines of characters that are to be printed.

(c) The stored columnar data is directed from the memory means to selected sets of print elements in the printhead by enabling means. The enabling means selectively directs the data to sets of print elements that are spaced apart along the upright array of print elements by a preselected line spacing.

(d) The printhead includes actuating means for simultaneously printing a group of multiple lines of characters on the recording medium.

(e) Means is provided in the printer for advancing the recording medium, after printing each group of lines, by a distance that will space the adjacent groups of lines by the preselected line spacing.

Relating the apparatus to conventional dot matrix printers, the printhead required in this machine can incorporate any conventional dot matrix technology. The only modification is that the printhead must include an array of print elements extending continuously across the relative rectilinear path of movement between the printhead and recording medium, and the total dimension of the array in a direction perpendicular to the rectilinear path must be greater than the combined heights of the multiple lines to be printed during each traverse of the recording medium by the printhead. The memory means required for storing columnar data can be any suitable electronic memory, including shift registers and equivalent devices. The enabling means for directing columnar data to selected sets of print elements in the array can be hardware circuitry, software algorithms, or a combination of both forms of technology. The actuating means for simultaneously printing the multiple lines can be the conventional printing mechanism associated with the type of dot matrix technology being utilized. The means for advancing the recording medium by the preselected line spacing can be the usual paper drive assembly included in such printers.

FIG. 1 schematically illustrates the basic mechanical elements of a typical dot matrix printer within which the present improvement can be incorporated. A printhead 10, having a vertical array of print elements 11 extending through it, is powered back and forth across the printer by intermittent operation of a carriage motor 14 that selectively drives a reversible lead screw 13. Signals and electrical power are provided to the printhead 10 through a retractable conductor cable 12.

The printhead 10 is mounted parallel to a rotatable platen 15 which supports a recording medium, such as paper, on which the lines of print are to be produced. Platen 15 is powered by an intermittently driven paper motor 17 that feeds paper to or from the printhead and spaces the lines of print following each pass of the printhead. Where required, a ribbon 18 can be interposed between the printhead 10 and the recording medium 16. An intermittently powered ribbon motor 20 is provided for properly feeding the ribbon 18 past the print elements 11 of the printhead 10 in those dot matrix printers where a transfer ribbon is utilized.

The above description of the mechanical features of a typical dot matrix printer are provided for illustration and general reference only. It will be evident from the following description that the present apparatus and method can be adapted to any existing form of dot matrix printer where sequential data is directed to an array of printing elements to create printed characters along multiple lines of print. Typical examples of such printers are illustrated in the patents referenced in the foregoing background portion of this disclosure.

Figure 2:
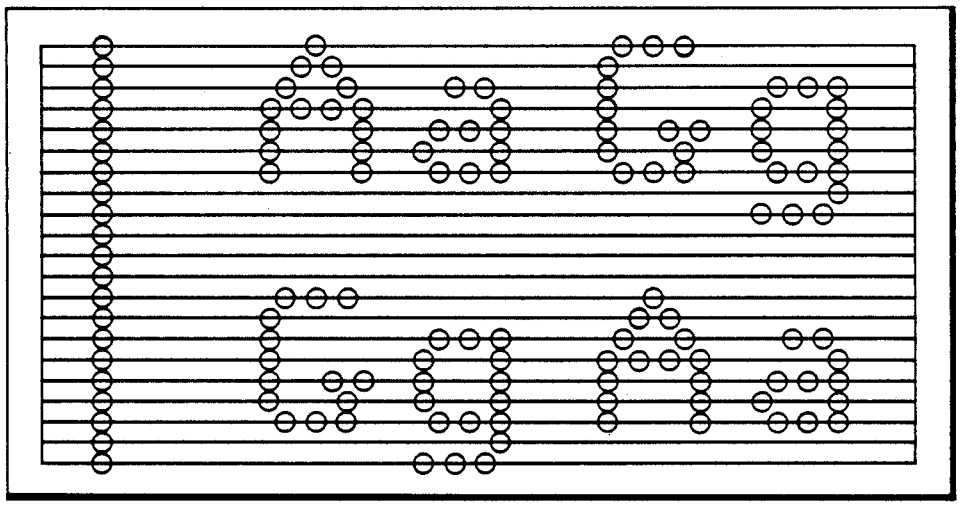
FIG. 2 is a diagram illustrating printing of characters at a first line spacing.
Figure 3:
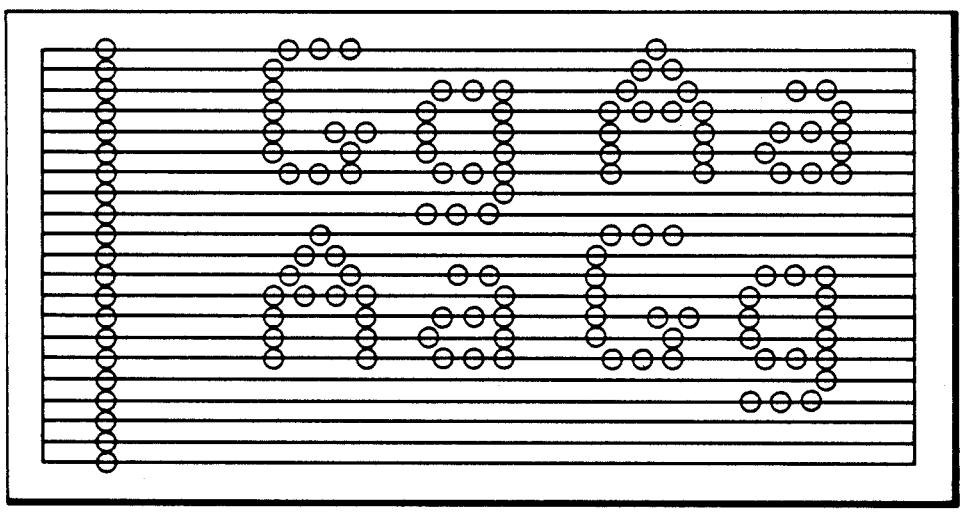
FIG. 3 is a view similar to FIG. 2, showing a second line spacing.
Figure 4:
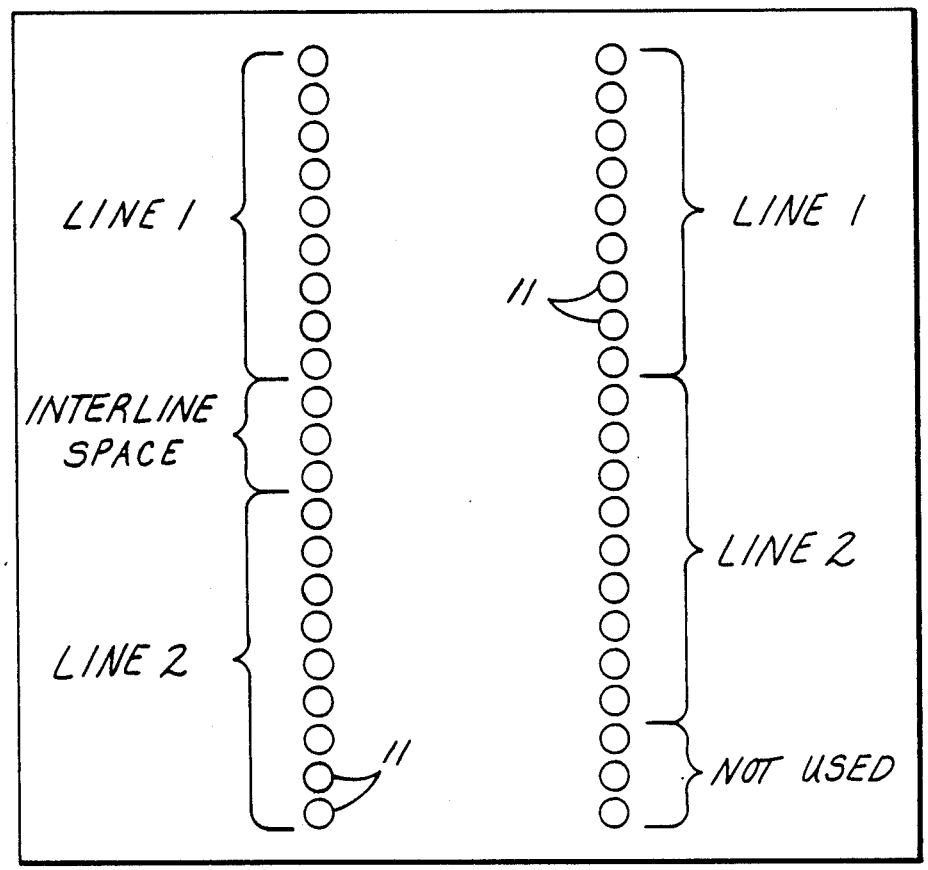
FIG. 4 is a diagram illustrating usage of print elements for producing two differently spaced formats.

FIGS. 2, 3 and 4 graphically illustrate the manner by which a dot matrix printer can simultaneously print a group of multiple lines of characters at one of a plurality of line spacings according to this disclosure. To accomplish this result, the print elements 11 (illustrated in FIG. 4 and to the left in FIGS. 2 and 3) are arranged in an uninterrupted array having a total height at least equal to the combined heights of the multiple lines of characters to be simultaneously printed, plus the combined heights of the maximum total line spacing selectable between them.

FIGS. 2–4 relate to a vertical array of print elements arranged in one straight line. They are adapted to produce printed characters, as illustrated in FIGS. 2 and 3, within dot matrices that are 9 dots in height and 7 dots in width. Industry standards in effect today require printing of such characters in alternate formats of 6 lines per inch and 8 lines per inch. On single row printers this is achieved by varying the distance the paper is fed after printing each line, which has a constant height. If a printhead is set up in a vertical configuration so that multiple lines can be printed at one spacing format, it is not possible to print multiple lines at a different spacing format without physically adjusting the printhead by spacing its segments at some multiple of ⅓th inch. To make such a change by software demands from a host computer would require an electrically operated mechanism for changing the print element spacing to be incorporated in the printhead design. The present disclosure achieves this result by selectively actuating different sets of print elements in the manner shown in FIGS. 2-4.

In the illustrated example, the printhead 10 is provided with 21 vertically arranged print elements 11 spaced on 1/72 inch centers. This arrangement is capable of printing two lines of characters in dot matrices which are 9 pixels high, at either 6 or 8 lines per inch.

When printing at 6 lines per inch (left side of FIG. 4), the top nine and bottom nine print elements are utilized as one set to print the respective lines of characters as separate sets. The center three print elements are unused in this mode. The row to row spacing of the resulting printed characters is then (9+3)/72 or 1/6 inch. When printing at 8 lines per inch (right side of FIG. 4), the top eighteen print elements are utilized as the other set, nine for each subset or line of printing. The bottom three print elements are then unused in this mode. The line-to-line spacing is now 9/72 or ⅛ inch. The differences in the resulting line spacings are graphically shown in FIGS. 2 and 3, which illustrate characters produced at spacings of 6 lines per inch and 8 lines per inch, respectively.

This concept can be extended to more than twenty one vertical print elements. For example, seventy two vertical print elements on 1/72 inch centers (and a nine print element font) could simultaneously print eight lines at six lines per inch or 6 lines at 8 lines per inch, or various combinations of lines spaced at 6 and 8 lines per inch. This would have the advantage of even higher speed than can be produced by use of a two line printhead.

The concept will also work with print elements spaced on other than 1/72 inch centers. For example, if a printhead has twenty eight print elements on 1/96 inch centers and uses a character font having twelve vertical dots per character, it will also print two lines at either 6 lines per inch (using the top and bottom twelve print elements as one set) or 8 lines per inch (using the top twenty four print elements as the other set). Such an arrangement would have the same speed advantage as the twenty one print elements illustrated in FIGS. 2, 3 and 4, but can provide greater vertical resolution.

This concept of printing multiple rows of characters at differing line spacings can also encompass existing dot matrix printer enhancement and techniques, such as half print element diameter shifters and multiple pass procedures to increase print density.

Figure 5:
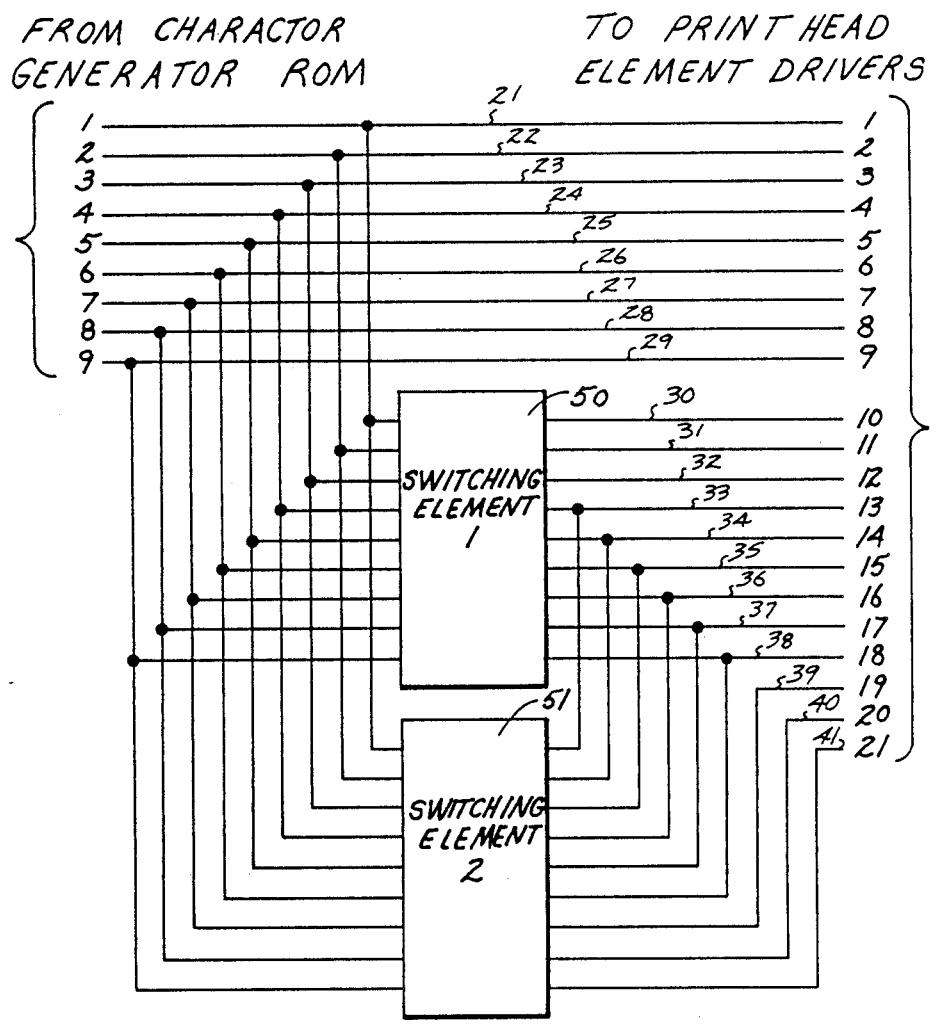
FIG. 5 is a block diagram showing routing of data to the printhead through switchable control elements.

A "hardware" embodiment of the invention is illustrated schematically in FIG. 5. As is conventional in the operation of single line dot matrix printers today, columnar data signals are provided to the printer by accessing a character generator read/only memory (ROM) location corresponding to the desired column of the desired character. With multiple line printing, the ROM is accessed again for the subsequent character lines. The columnar data signals are then combined and directed to the print elements.

In the hardware approach shown in FIG. 5, the columnar data is routed to the appropriate print element driver by enabling the correct path, according to the desired line spacing. The columnar data signals for a column of the first line of characters is passed directly to the drivers for print elements 1-9 (shown at the right side) through conductors 21-29, respectively. If the desired character line spacing is 8 lines per inch, a first mechanical or electronic switching element 50 is operated or enabled, which passes the second character line's columnar data signals to the drivers of print elements 10-18 through conductors 30-38. When printing at 6 lines per inch, the switching element 50 is not actuated or is disabled, but a second switching element 51 is actuated or enabled, passing the second character line's columnar data signals to the drivers for print elements 13-21 through conductors 33-41. The switching elements 50 and 51 can be manually actuated or can be electronically actuated through circuitry in the printer itself or in a controlling machine or data processor.

Figure 7:
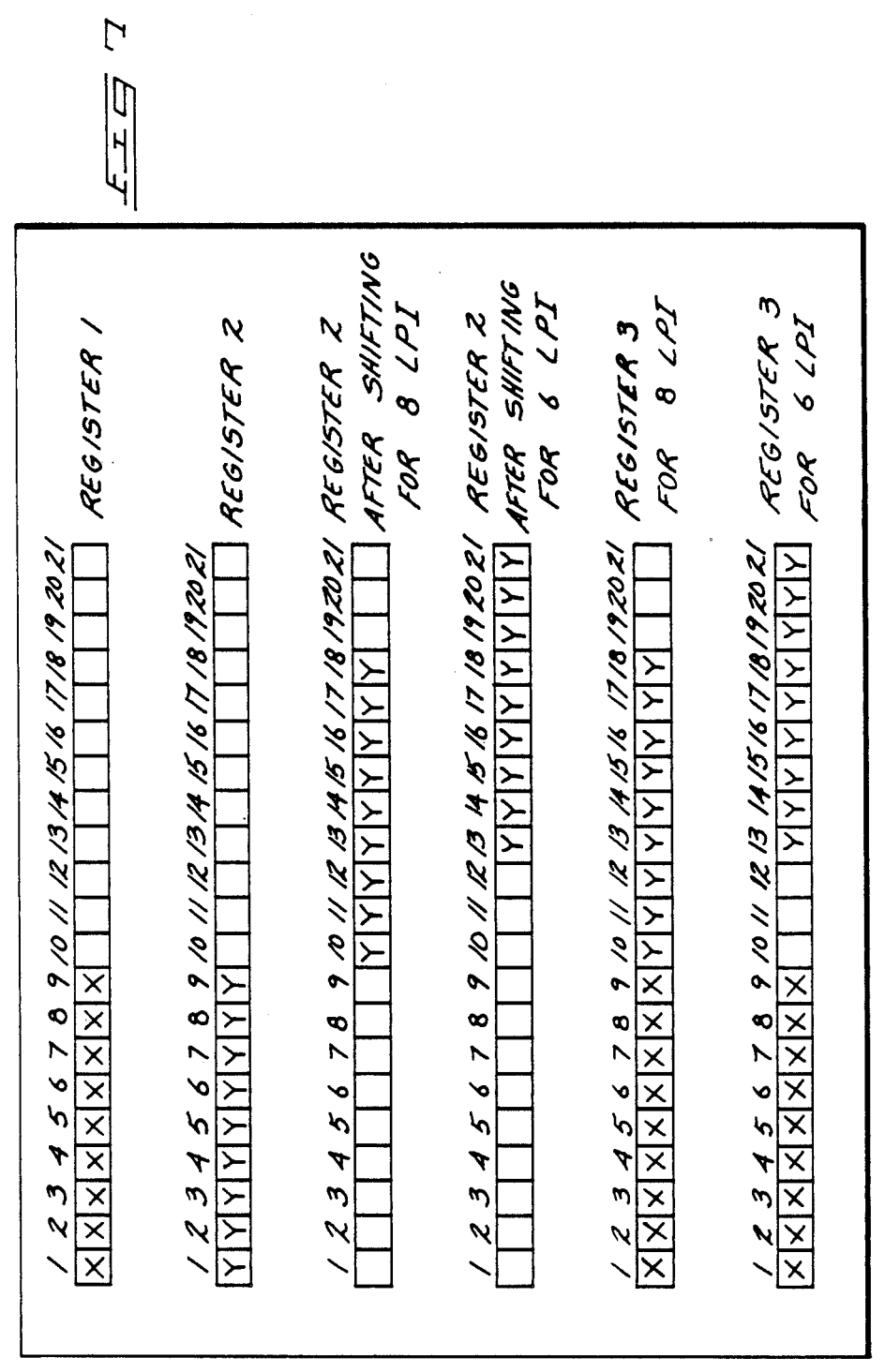

FIGS. 6-10 relate to an alternate embodiment in which a software implementation of the invention is shown, where routing of columnar data to the print elements is achieved by operation of a master processor unit (MPU) 60. The MPU 60 can be a dedicated processor in the printer itself or can be physically located within a controlling machine or host computer with which the printer is utilized. Referring to FIG. 7, columnar data patterns for the columns in each line are first fully assembled in computer registers or memory locations. The first line's data pattern is placed in register 1 and the second line's data pattern is placed in register 2. Registers 1 and 2 are then combined (by an OR operation), producing a composite pattern in register 3. However, prior to combining the registers, register 2 is shifted right. For 8 lines per inch printing, register 2 is shifted nine bits; for 6 lines per inch printing it is shifted twelve bits. The contents of register 3 are directed to the drivers for the respective print elements in the array provided in the previously-described printhead 10.

In both the hardware and software controlled embodiments of the invention, the paper or other recording medium 16 is advanced by the appropriate distance after printing of each group of multiple lines of characters. In this example, this distance would be either ¼ inch (for 8 lines per inch printing) or ⅓ inch (for 6 lines per inch printing).

Figure 6:
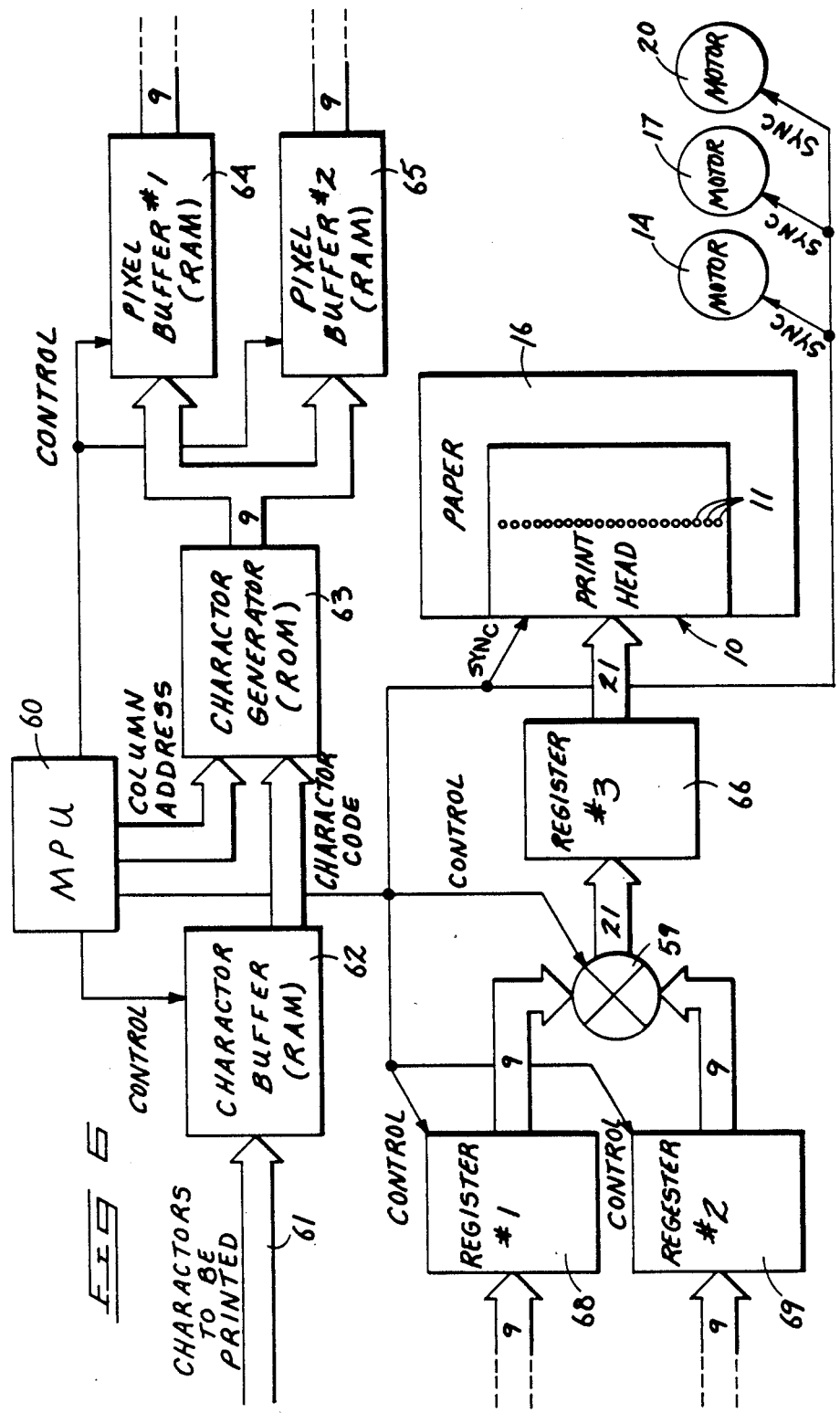
FIG. 6 is a block diagram of a computer controlled printhead system.

FIG. 6 schematically illustrates the components of a software controlled embodiment of the invention. The characters to be printed are typically transmitted over a communications link 61 from a host computer (not shown) to the printer. They are received at the printer and stored in a FIFO (First-in, first-out) character buffer 62 under control of the printer's MPU 60. The MPU 60 removes characters from the buffer 62 in the correct sequence, converts the characters to pixels according to patterns specified in a character generator read-only memory (ROM) 63, and activates drive solenoids or other actuating elements for the individual print elements 11 in synchronization with the relative position of the printhead 10 and recording medium or paper 16. The solenoids or other actuating elements cause the corresponding print elements to produce the printed characters by constructing a pixel pattern that corresponds to the desired characters.

When the MPU 60 removes certain characters or sequences of characters from the character buffer 62, it recognizes them as control sequences and does not print them. Instead, it modifies the printer's performance accordingly. Using this technique, the MPU 60 can direct the printer to change line-to-line spacing as control signals are received from character buffer 62 indicative of a line spacing selected from two or more alternative line spacings.

Figure 11:
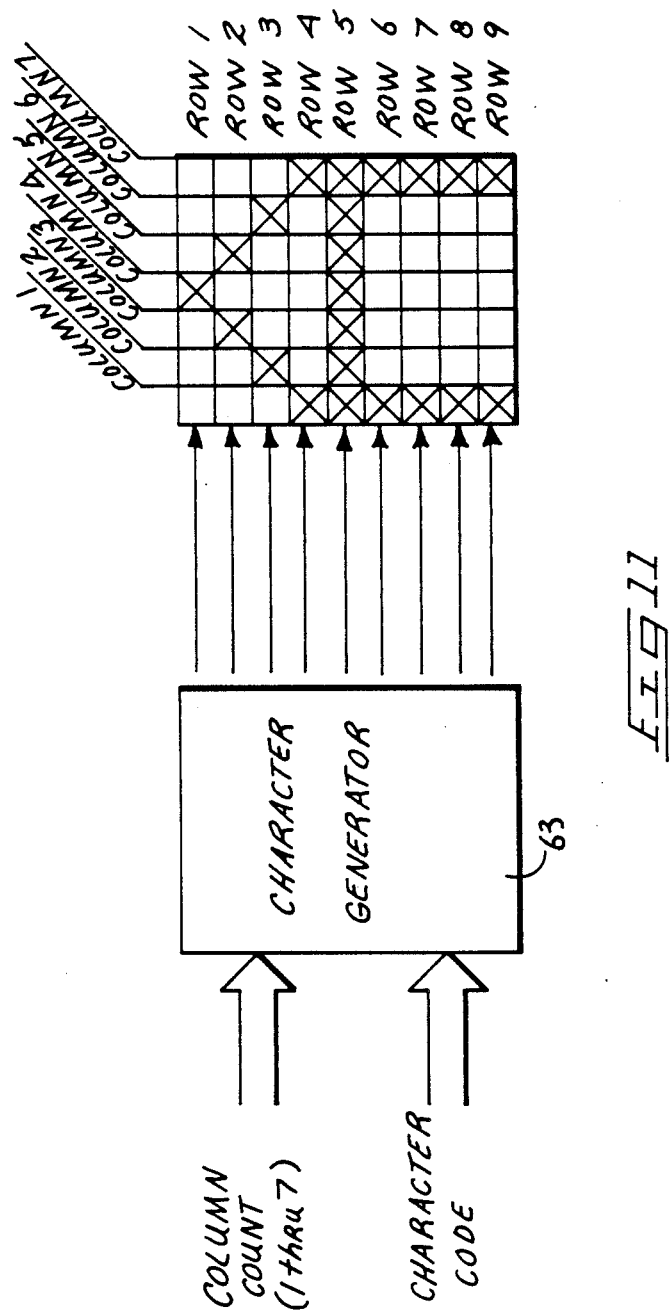
FIGS. 11 and 12 are diagrams illustrating development of printed characters by processing of columnar data.

The character generator ROM has two inputs: A unique character code (which corresponds to the character received from the character buffer 62) and a column address supplied by the MPU 60. Through repeated access, character generator ROM 63 produces a pattern of pixels for each column in the desired font or matrix. Each pattern has one pixel for every row in the font. FIG. 11 shows an example of a 7-column by 9-row font produced by character generator ROM 63. The shaded areas represent pixels that would cause the print elements 11 in the printhead 10 to be actuated when they are located over the appropriate position on the recording medium or paper 16.

Figure 12:
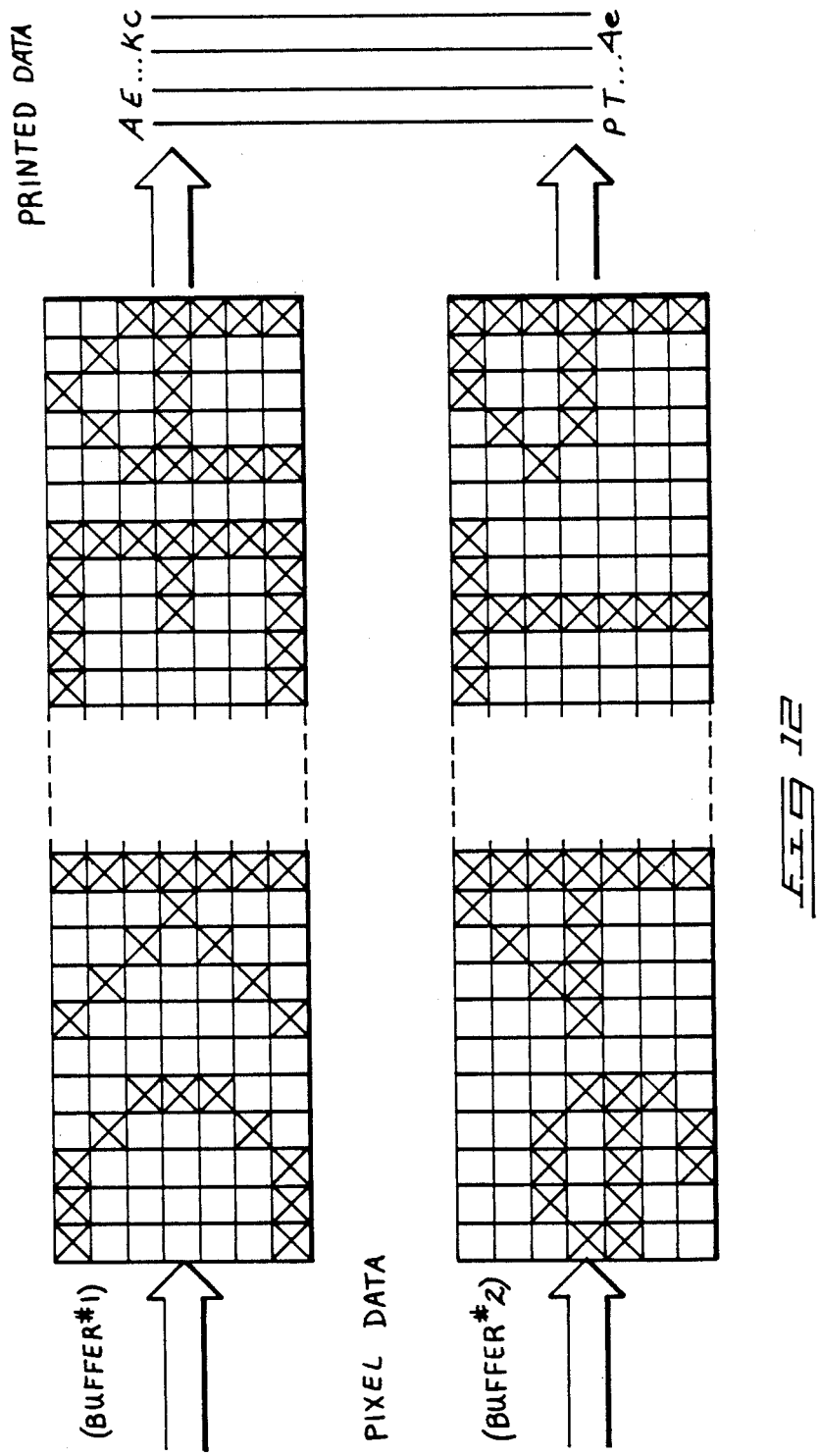

In an ordinary printer, the pixel patterns produced by character generator ROM 63 could be used for immediate printing. However, in this application, the patterns are stored in one of two pixel buffers 64 or 65 (random-access-memory, or RAM) and are combined before being used for printing purposes. Each entry in a pixel buffer 64 or 65 corresponds to a column of pixel data. The pixel buffers 64 and 65 provide sufficient storage space to have one column entry for each column of data to be printed on an entire line. The first buffer is filled with column pixel data for all of the characters to be printed on the first line. Then the pixel buffer 65 is filled with data for all of the characters on the second line. An illustration of this concept is provided in FIG. 12.

After both pixel buffers 64 and 65 are filled, the MPU 60 combines corresponding entries in each buffer according to an algorithm which accounts for the desired line-to-line spacing. The controlling software is diagramed in FIG. 10.

Figure 8:
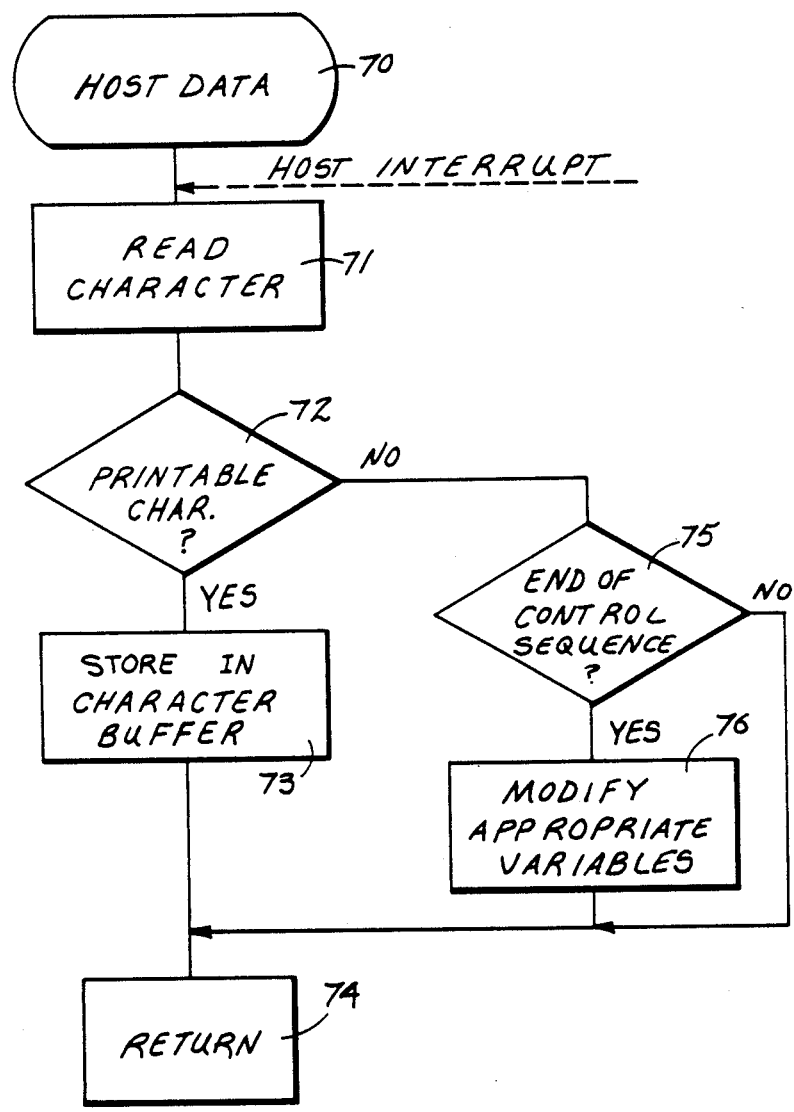
FIG. 8 is a software flow diagram describing storage of character data.
Figure 9:
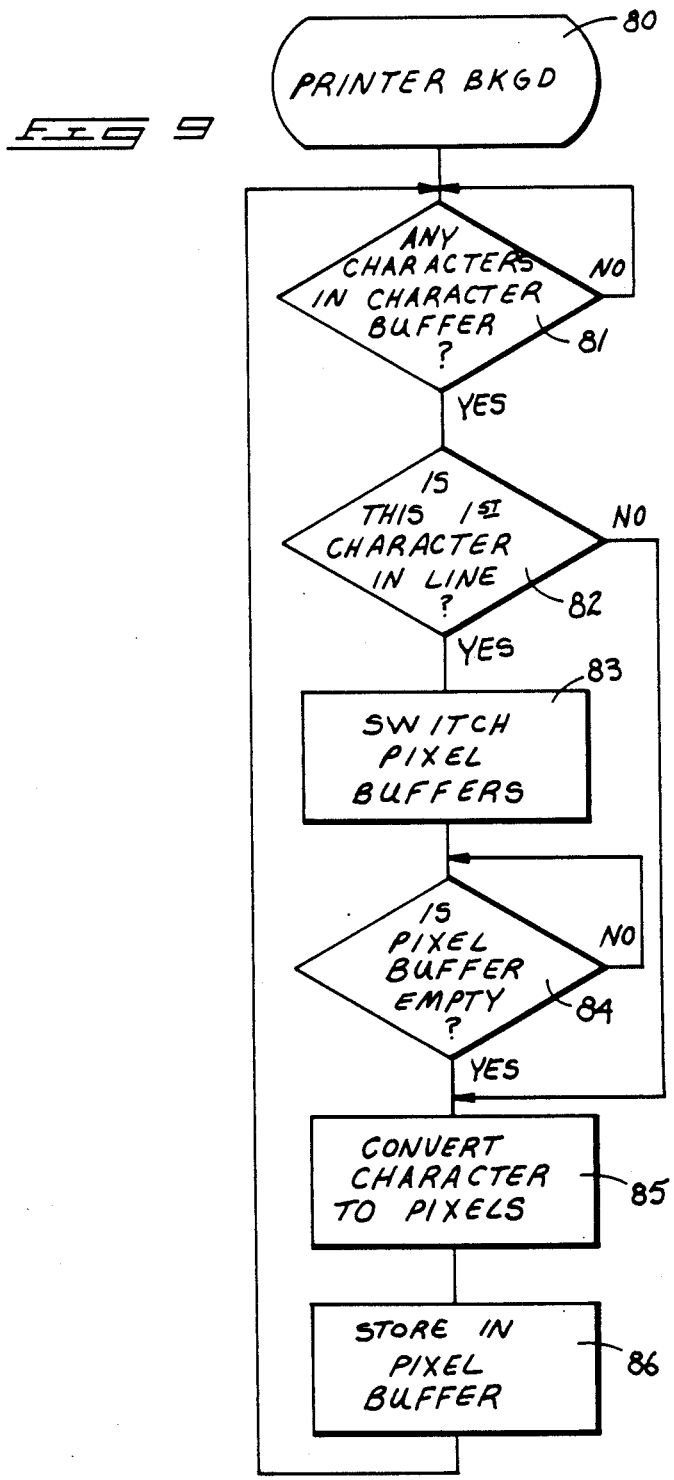
FIG. 9 is a software flow diagram describing conversion and storage of pixel data.
Figure 10:
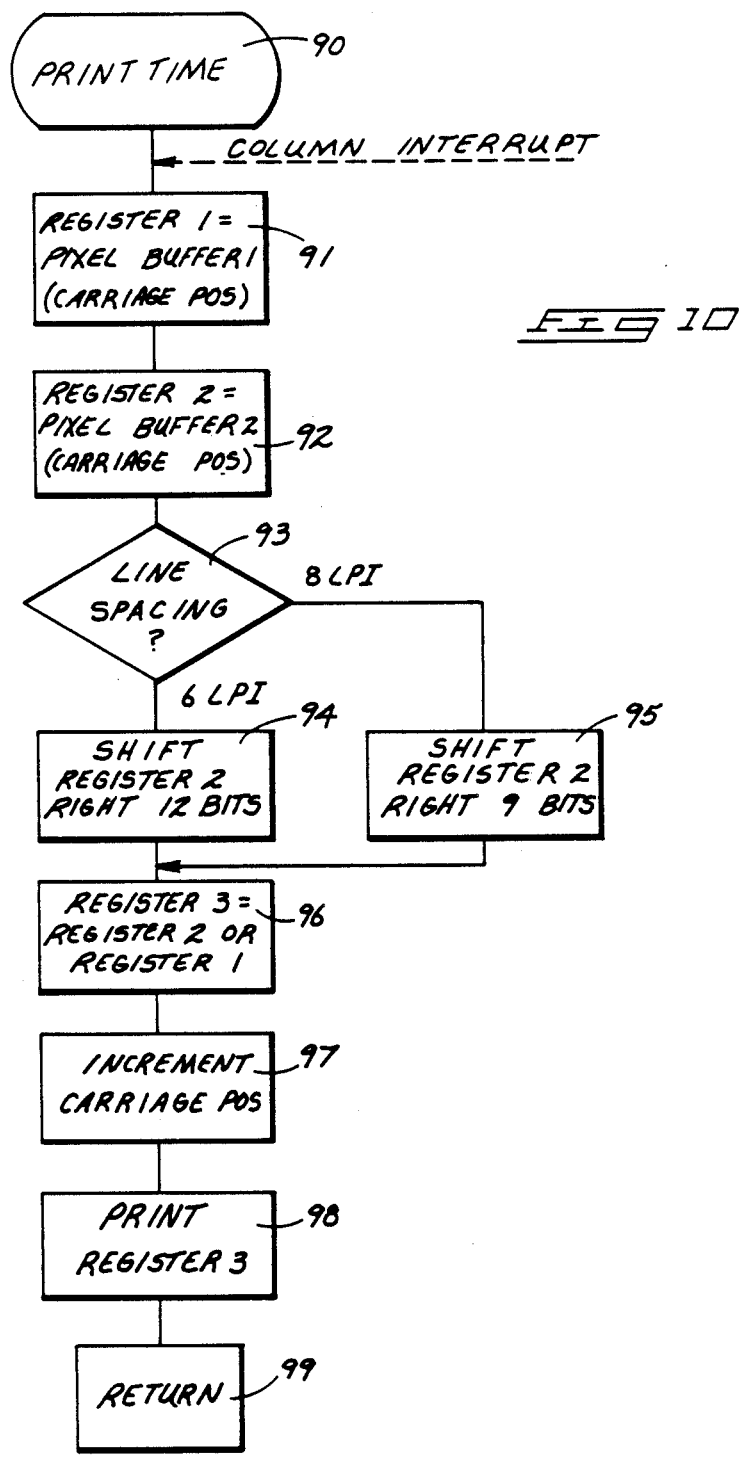
FIG. 10 is a software flow diagram describing printing of characters at alternative line spacings.

FIGS. 8, 9 and 10 respectively diagram controlling software for control of the character buffer 62, the pixel buffers 64 and 65, and the print register 66. Print register 66 contains a series of shift registers or memory addresses corresponding respectively to the individual print elements 11 in printhead 10.

Referring to the software diagrams, the controlling software for the character buffer 62 processes character information received from the host device. Receipt of data is graphically illustrated in the flow chart shown in FIG. 8 at symbol 70. The host data is then read or processed, as indicated by symbol 71, and subjected to a decision as to whether the data relates to a printable character or not, as indicated by symbol 72. If the data relates to a printable character, it is stored in the character buffer 62, as indicated by symbol 73, and the software process returns to its initialized state (symbol 74). If the data not relate to a printable character, it is analyzed to determine whether it includes the end of a control sequence (symbol 75). If it does, the data is processed to modify its appropriate variables prior to being appropriately stored in memory for future use. If it does not, the decision and processing sequences are repeated.

FIG. 9 is a flow chart of the algorithm or software relating to storage of pixels in buffers 64 and 65. Data is received from character buffer 62, as symbolized by the starting symbol 80. It is analyzed to determine whether data relating to characters to be printed are available in the character buffer 62 (symbol 81). If this condition is "true," the data is analyzed to determine whether the incoming data is the first character in a line to be printed (symbol 82). If this condition results in a positive decision, the data is processed to address it to the proper locations within the pixel buffers 64 and 65, as indicated by symbol 83. A decision process, indicated by symbol 84, determines whether the respective pixel buffers 64 and 65 have available address locations for the incoming data. Before being directed to the pixel buffers 64 and 65, the data is converted to pixel data, as shown by symbol 85 and is subsequently stored by processing steps indicated at symbol 86.

FIG. 10 is a flow chart of the software relating to preparation of line data for simultaneous printing at one of two or more alternate line spacings. As the printer is activated after both pixel buffers 64 and 65 are filled, as indicated by start symbol 90, the MPU 60 combines corresponding entries in each buffer 64, 65 according to an algorithm which accounts for the desired line-to-line spacing. The MPU 60 fetches an entry from the first buffer 64 in a storage register 68 (FIG. 6) and the corresponding entry from the second buffer 65 in its register 69. The data in register 68 is not modified, but the data in register 69 is shifted so that it would not overlap the data in register 68 if the two registers were to be overlaid. Then the data in the two registers 68 and 69 are combined through the computer's OR operation and the combined results are placed in print register 66. The contents of register 66 are subsequently directed to the printhead 10, which will simultaneously print one column of pixel data from a character in each line as it is produced on the paper or recording medium 16. The number of positions that register 69 is shifted sets of the desired line-to-line spacing. Since the MPU 60 can be programmed to shift a variable number of positions, the printer can be made to change line-to-line spacing in response to receipt of a control sequence or a switch closure.

Referring to FIG. 10, the processing of data in registers 68 and 69 is indicated by symbols 91 and 92. The decision symbol 93 indicates the analysis of data to determine the identity of line spacing control signals includes with the incoming data. Depending upon the nature of the line spacing control signals identified, data within register 69 is shifted appropriately, as indicated by symbols 94 and 95. Symbol 96 indicates the software steps involved in combining data from register 68 and 69 into print register 66. This data is then processed to properly relates it to the printing position of printhead 10 (symbol 97) and is stored in print register 66, as indicated by symbol 98. At the completion of this process, the software is returned to its initialized status, as indicated by symbol 99.

In the following example, assume that the printhead 10 has twenty one print elements arranged vertically on 1/72 inch centers. Each bit in a register will correspond to one pixel, spaced on 1/72 inch centers. Also assume that the character font has a 9-pixel column and that printing at both 6 and 8 lines per inch is desired. Referring to FIG. 7, it can be seen that it is necessary to shift data in register 68 until it would be contiguous if overlaid with data in register 68 is order to point the two lines at 9/72 inch spacing (8 lines per inch). If a 3 bit space is left between the data in registers 68 and 69, printing will be achieved at a 12/72 inch spacing or 6 lines per inch.

FIG. 6 schematically illustrates the control means 59 by which data from registers 68 and 69 is combined in print register 66. This control means 59 can comprise specially designed electronic circuits, but the combining steps indicated by symbols 94, 95 and 96 are preferably carried out within the structure of MPU 60.

FIG. 6 also graphically illustrates various control sequences by which the memory devices and printer equipment are properly sequenced and operated under operating control of MPU 60. These operational controls include synchronized operation of the conventional print element actuators including within printhead 10, as well as carriage motor 14, paper motor 17 and ribbon motor 20.

It should be evident that one skilled in the design of dot matrix printers can readily apply this improvement to any physical form of such printers and its associated electronic circuitry. The improvement provides increased print speed and greater versatility in line spacing than has been previously available in such printers.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance the doctrine of equivalents.

We claim:

1. A dot matrix printer for simultaneously printing successive groups of multiple lines of characters on a recording medium within dot matrices of a common predetermined character height at a selected line spacing of one-sixth inch or one-eighth inch, while maintaining the predetermined character height constant independently of the selected line spacing, comprising:
   a printhead having an uninterrupted array of functionally identical print elements arranged in positions for individually marking single dots within a column presentation on a recording medium during simultaneous printing of a group of two or more lines of characters generated within dot matrices of a predetermined constant character height, the number of print elements being greater than twice the number of dots in the height of each dot matrix;
   wherein the print elements are evenly spaced at a uniform print element pitch related to a "whole fraction" multiple of the difference between the one-sixth inch and one-eighth inch line spacing;
   memory means for storing columnar data for two or more lines of characters;
   control means for directing columnar data from the memory means to different selected sets of print elements to vary the character to character vertical spacing between the multiple lines in each group of lines while maintaining the character height constant independently of whether the one-sixth inch or one-eighth inch line spacing is chosen; and
   means for advancing the recording medium, after printing of each group of multiple lines, by a distance that will space the successive groups of multiple lines by the selected character to character vertical line spacing with each group.

2. The dot matrix printer of claim 1 wherein the control means comprises:
   switching means for directing stored columnar data signals to the different selected sets of prints elements in the array depending upon whether the one-sixth inch or the one-eighth inch line spacing is chosen.

3. The dot matrix printer of claim 1, wherein the control means comprises:
   first switching means operably connected to the print elements and selectively actuable for directing stored columnar data signals to print elements in the array for printing multiple lines at one-sixth inch line spacings;
   second switching means operably connected to the print elements and selectively actuable for directing stored columnar data signals to print elements in the array for printing multiple lines at one-eight inch line spacing with character to character vertical spacing equal to the difference between one-sixth inch and one-eight inch.

4. The dot matrix printer of claim 1, wherein the control means comprises:
   programmable means comprising a programmed data processor for directing stored columnar data signals to different selected sets of print elements in the array depending upon whether the one-sixth inch or the one-eight inch line spacing is chosen.

5. The dot matrix printer of claim 1, wherein the control means comprises:
   programmable means comprising a programmed data processor for:
   (a) storing columnar data representative of each line of characters within separate storage locations;
   (b) combining the stored columnar data within the separate storage locations as a function of the selected line spacing; and
   (c) directing the combined stored columnar data to storage locations corresponding to individual print elements in the array.

6. The dot matrix printer of claim 1, wherein the print element pitch is selected from a group consisting of one seventy-second inch and one ninety-sixth inch.

7. A printer for producing dot matrix characters of a common height in successive groups of multiple lines during each traverse of a recording medium by a printhead, the lines being spaced at either of two different selectable line spacing that are each a whole fraction of an inch, comprising:
   a printhead;
   means for selectively imparting relative movement between the printhead and a recording medium along a rectilinear path;
   the printhead including an uninterrupted array of evenly spaced, individually operable print elements extending across the rectilinear path, the total dimension of the array in a direction perpendicular to the rectilinear path being greater than the combined character heights of the multiple lines printed during each traverse of the recording medium by the printhead along the rectilinear path;
   wherein the print elements are evenly spaced at a uniform print element pitch related to a "whole fraction" multiple of the difference between the two different selectable line spacings;

first memory means for storing columnar data for two or more lines of characters, the columnar data including pixel patterns required for printing of a group of multiple lines across the recording medium;

second memory means for storing line spacing control signals indicative of the two different selectable line spacings;

control means operably connected to the first and second memory means and to the individual print elements for directing columnar data from the first memory means to separate sets of print elements on the printhead as defined by stored line spacing control signals received from the second memory means;

actuating means operably connected to the printhead for simultaneously causing the sets of print elements to print a group of multiple lines of characters on the recording medium during each traverse of the recording medium as defined by the columnar data directed to them from the first memory means, the lines within each group being separated by the selectable line spacing as defined by the line spacing control signals received from the second memory means; and means operably connected to the second memory means for advancing the recording medium, after printing of each group of multiple lines, by a distance perpendicular to the rectilinear path of the printhead as defined by the line spacing control signals received from the second memory means to thereby space successive adjacent groups of multiple lines by the selectable line spacing separating the sets of print elements that printed them.

8. The dot matrix printer of claim 7 wherein the control means comprises:
switching means for directing stored columnar data signals to the different print elements in the array depending upon the selected line spacing chosen.

9. The dot matrix printer of claim 7, wherein the control means comprises:
first switching means operably connected to the print elements and selectively actuable for directing stored columnar data signals to print elements in the array within sets contiguous to one another;
second switching means operably connected to the print elements and selectively actuable for directing stored columnar data signals to print elements in the array within sets separated from one another by at least one unused print element.

10. The dot matrix printer of claim 7, wherein the control means comprises:
programmable means comprising a programmed data processor for directing stored columnar data signals to different print elements in the array depending upon the selected lines spacing chosen.

11. The dot matrix printer of claim 7, wherein the control means comprises:
programmable means comprising a programmed data processor for:
(a) storing columnar data representative of each line of characters within separate storage locations;
(b) combining the stored columnar data within the separate storage locations as a function of the selected line spacing; and
(c) directing the combined stored columnar data to storage locations corresponding to individual print elements in the array.

12. The dot matrix printer of claim 7, wherein the control means comprises:
means for separately delivering columnar data representative of each line of characters;
means for combining the delivered columnar data as a function of the selected line spacing; and
means for directing the combined columnar data to individual print elements in the array.

13. The printer of claim 7, wherein said control means comprises:
third memory means operably connected to the printhead for storing enabling signals for the individual print elements;
and switching means interposed between the first, second and third memory means for directing columnar data from the first memory means to the third memory means as a function of line spacing control signals received from the second memory means.

14. The printer of claim 9, wherein said control means comprises:
third memory means operably connected to the printed for storing enabling signals for the individual print elements;
switching means interposed between the first, second and third memory means for directing columnar data from the first memory means to the third memory means as a function of line spacing control signals received from the second memory means; and
the switching means being comprised of hardware switch members wired between the first and third memory means.

15. The printer of claim 7, wherein said control means comprises:
third memory means operably connected to the printhead for storing enabling signals for the individual print elements;
switching means interposed between the first, second and third memory means for directing columnar data from the first memory means to the third memory means as a function of line spacing control signals received from the second memory means; and
the switching means being comprised of a programmed data processor.

16. A method for printing successive groups of multiple lines of characters on a recording medium in columns of dots within matrices having a predetermined constant height and with adjacent vertical lines of characters spaced apart by either one-sixth inch or one-eighth inch selectable line spacing, comprising the following steps:
(a) storing columnar data for two or more lines or characters, the columnar data including pixel patterns required for printing of a group of multiple lines of constant height across a recording medium;
(b) storing line spacing control signals indicative of a line spacing selected from the one-sixth inch or the one-eighth inch line spacings;
(c) directing the stored columnar data for two or more lines of characters to different sets of print elements defined in response to the stored line spacing control signals, the sets of print elements being included within a uninterrupted array of print elements having a total height at least equal to the combined heights of the multiple lines of characters to be simultaneously printed as a group, plus the combined heights of the maximum total line spacing selectable between them;

(d) simultaneously actuating the separate sets of print elements to print a group of multiple lines of characters as defined by the stored columnar data, the lines within each group being separated by the one-sixth inch or one-eighth inch selectable line spacing as defined by the stored line spacing control signals; and (e) advancing the recording medium to space successive groups of multiple lines by the one-sixth inch or one-eighth inch selectable line spacing after completing the printing of each group of mulitple lines as defined by the stored line spacing control signals.

17. A dot matrix printer for simultaneously printing characters in successive groups of multiple lines during each traverse of a recording medium, the characters being generated within dot matrices of a predetermined constant character height at either of two different selectable line spacings that are each a whole fraction of an inch, comprising:

a printhead provided with a plurality of print elements that are evenly spaced at a uniform print element pitch related to a whole fraction multiple of the difference between the selectable line spacings, the print elements being arranged in an uninterrupted array of print elements having a total height that is at least equal to the combined constant character heights of the multiple lines to be simultaneously printed plus the height of the maximum interline space between them at either of the two different selectable line spacing;

print control means for selectively actuating two different sets of print elements, one spanning all of the print elements on the print head and the other spanning less than all of the print elements, to vary the interline space between the multiple lines of characters printed as a function of a selected line spacing chosen from the two different selectable line spacings while maintaining a constant character height; and line space control means for advancing the recording medium, after printing each group of multiple lines, by a distance related to the combined heights of the multiple lines of characters in each group plus the combined heights of any interline spaces between them.

18. The dot matrix printer of claim 17 wherein the two sets of print elements each include a common subset at one end of the printhead, the remaining subset of the one set being at the opposite end of the printhead and the remaining subset of the other set being spaced inwardly from the opposite end of the printhead.

19. The dot matrix printer of claim 17 wherein the print control means comprises:

switching means operably connected to the printhead for directing stored columnar data signals to actuate different sets of print elements in the array depending upon the chosen selectable line spacing.

20. The dot matrix priner of claim 17, wherein the print control means comprises:

first switching means operably connected to the print elements and selectively actuable for directing stored columnar data signals to actuate print elements in the array within subsets contiguous to one another;

second switching means operably connected to the printed elements and selectively actuable for directing stored columnar data signals to actuate print elements in the array within subsets separated from one another by at least one unused print element.

21. The dot matrix printer of claim 17, wherein the print control means comprises:

programmable means comprising a programmed data processor operably connected to the printhead for directing stored columnar data signals to actuate different sets of print elements in the array depending upon the chosen selectable line spacing.

22. The dot matrix printer of claim 17, wherein the print control means comprises:

programmable means comprising a programmed data processor for:
(a) storing columnar data representative of each line of characters;
(b) combining the stored columnar data as a function of the chosen selectable line spacing; and
(c) directing the combined stored columnar data to individual print elements.

23. The dot matrix printer of claim 17, wherein the print control means comprises:

means for separately delivering columnar data representative of of each line of characters;
means for combining the delivered columnar data as a function of the chosen selectable line spacing; and
means for directing the combined columnar data to individual print elements in the array.

* * * * *

REEXAMINATION CERTIFICATE (2117th)

United States Patent [19]

Sims et al.

[11] B1 4,953,995

[45] Certificate Issued Oct. 26, 1993

[54] DOT MATRIX PRINTER AND METHOD FOR PRINTING MULTIPLE LINES AT DIFFERENT LINE SPACINGS

[75] Inventors: Louis Sims; Fred LeFriec, both of Spokane, Wash.; Joseph Dubner, Hayden Lake, Id.; Brian Peavey, Spokane, Wash.

[73] Assignee: Output Technology Inc., Spokane, Wash.

Reexamination Requests:
No. 90/002,409, Aug. 19, 1991
No. 90/002,677, Mar. 18, 1992
No. 90/002,782, Jul. 15, 1992

Reexamination Certificate for:
Patent No.: 4,953,995
Issued: Sep. 4, 1990
Appl. No.: 185,452
Filed: Apr. 25, 1988

Related U.S. Application Data

[63] Continuation of Ser. No. 924,352, Oct. 29, 1986, abandoned.

[51] Int. Cl.$^5$ ................................. B41J 2/51
[52] U.S. Cl. ................... 400/121; 101/930.4; 400/555
[58] Field of Search ............... 400/121, 124, 303, 545, 400/555, 582, 583, 82; 101/93.04, 93.05; 395/104, 108, 114, 115

[56] References Cited

U.S. PATENT DOCUMENTS

| | | | |
|---|---|---|---|
| 2,013,677 | 9/1935 | Stickney | 400/555 |
| 3,858,703 | 1/1979 | Daley | 400/124 |
| 4,079,824 | 3/1978 | Ku | 400/124 |
| 4,408,907 | 10/1983 | Bernardis | 400/124 |
| 4,565,461 | 1/1986 | Usui et al. | 400/569 |
| 4,601,593 | 7/1986 | Collins et al. | 400/121 |
| 4,683,479 | 7/1987 | Horiya | 400/120 |

FOREIGN PATENT DOCUMENTS

| | | | |
|---|---|---|---|
| 0031421A2 | 7/1981 | European Pat. Off. | |
| 109765 | 8/1981 | Japan. | |
| 101072 | 8/1983 | Japan | 400/124 |
| 16351 | 4/1985 | Japan. | |

OTHER PUBLICATIONS

Selected pages from the "MSP-10/15 USER'S MANUAL" for the Citizen MSP-10/15 dot matrix printer, bearing a copyright notice of 1984.

DH Technology Information Brochure for the Series 4000/4100 18-wire printhead, published in 1982-1985 time frame.

*Primary Examiner*—David A. Wiecking

[57] ABSTRACT

A method and apparatus for printing multiple lines of characters simultaneously on a dot matrix printer and making available to the user a choice of alternate line spacings without physical or mechanical alteration of the printhead. The printhead includes an uninterrupted array of print elements having a total height greater than the combined total height of the multiple lines that are simultaneously printed plus the combined height of the intervening line spaces. By directing columnar character data to selected sets of print elements, the printhead can produce characters of a constant height with selected variations in interline spacing.

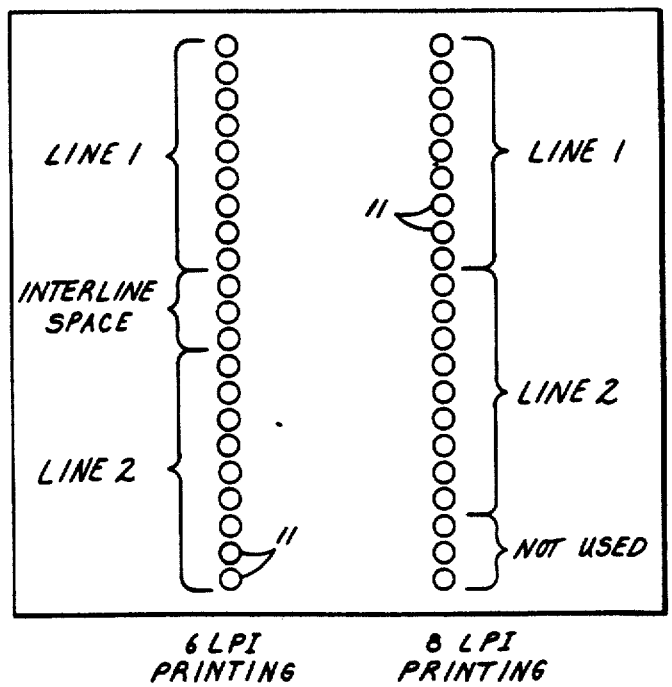

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–23 are cancelled.

* * * * *

REEXAMINATION CERTIFICATE (2670th)
United States Patent [19]
Sims et al.

[11] B1 4,953,995
[45] Certificate Issued Sep. 12, 1995

[54] DOT MATRIX PRINTER AND METHOD FOR PRINTING MULTIPLE LINES AT DIFFERENT LINE SPACINGS

[75] Inventors: Louis Sims; Fred LeFriec, both of Spokane, Wash.; Joseph Dubner, Hayden Lake, Id.; Brian Peavey, Spokane, Wash.

[73] Assignee: Output Technology Inc., Spokane, Wash.

Reexamination Requests:
No. 90/002,409, Aug. 19, 1991
No. 90/002,677, Mar. 18, 1992
No. 90/002,782, Jul. 15, 1992

Reexamination Certificate for:
Patent No.: 4,953,995
Issued: Sep. 4, 1990
Appl. No.: 185,452
Filed: Apr. 25, 1988

Related U.S. Application Data

[63] Continuation of Ser. No. 924,352, Oct. 29, 1986, abandoned.

[51] Int. Cl.$^6$ ............................... B41J 2/51
[52] U.S. Cl. .................... 400/124.04; 400/124.28; 400/555; 101/93.94
[58] Field of Search ............... 400/121, 124, 303, 545, 400/555, 582, 583, 82; 101/93.04, 93.05; 395/104, 108, 114, 115

[56] References Cited

U.S. PATENT DOCUMENTS

| | | | |
|---|---|---|---|
| 3,858,703 | 1/1975 | Duley | 400/124 |
| 4,079,824 | 3/1978 | Ku | 400/124 |
| 4,408,907 | 10/1983 | Bernardis | 400/124 |
| 4,565,461 | 1/1986 | Usui | 400/569 |
| 4,601,593 | 7/1986 | Collina et al. | 400/121 |
| 4,683,479 | 7/1987 | Horiya | 400/120 |

FOREIGN PATENT DOCUMENTS

| | | | |
|---|---|---|---|
| 0031421A2 | 7/1981 | European Pat. Off. | 400/124 |
| 0185999 | 7/1986 | European Pat. Off. | 400/124 |
| 109765 | 8/1981 | Japan | 400/124 |
| 74185 | 5/1982 | Japan | 400/611 |
| 101072 | 8/1983 | Japan | 400/124 |
| 103765 | 6/1984 | Japan | 400/121 |
| 16351 | 4/1985 | Japan | 400/124 |

OTHER PUBLICATIONS

Selected pages from the "MSP-10/15 User's Manual" for the Citizen MSP-10/15 dot matrix printer, bearing a copyright notice of 1984.

OH Technology Information Brochure for the Series 4000/4100 18-wire printhead, published in the 1982-1985 time frame.

*Primary Examiner*—David A. Wiecking

[57] ABSTRACT

A method and apparatus for printing multiple lines of characters simultaneously on a dot matrix printer and making available to the user a choice of alternate line spacings without physical or mechanical alteration of the printhead. The printhead includes an uninterrupted array of print elements having a total height greater than the combined total height of the multiple lines that are simultaneously printed plus the combined height of the intervening line spaces. By directing columnar character data to selected sets of print elements, the printhead can produce characters of a constant height with selected variations in interline spacing.

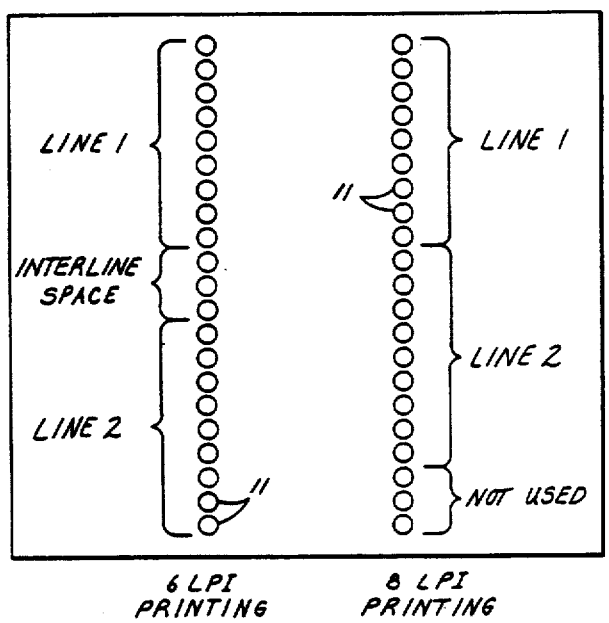

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-16 is confirmed.

Claim 17 is determined to be patentable as amended.

Claims 18-23, dependent on an amended claim, are determined to be patentable.

17. A dot matrix printer for simultaneously printing characters in successive groups of multiple lines during each traverse of a recording medium, the characters being generated within dot matrices of a predetermined constant character height at either of two different selectable line spacings that are each a whole fraction of an inch, comprising:
    a printhead provided with a plurality of print elements that are evenly spaced at a uniform print element pitch related to a whole fraction multiple of the difference between the selectable line spacings *that are each a whole fraction of an inch*, the print elements being arranged in an uninterrupted array of print elements having a total height that is at least equal to the combined constant character heights of the multiple lines to be simultaneously printed plus the height of the maximum interline space between them at either of the two different selectable line spacing;
    print control means for selectively actuating two different sets of print elements, one spanning all of the print elements on the print head and the other spanning less than all of the print elements, to vary the interline space between the multiple lines of characters printed as a function of a selected line spacing chosen from the two different selectable line spacings while maintaining a constant character height; and
    line space control means for advancing the recording medium, after printing each group of multiple lines, by a distance related to the combined heights of the multiple lines of characters in each group plus the combined heights of any interline spaces between them.

* * * * *